US006919143B2

(12) United States Patent
Hwang et al.

(10) Patent No.: US 6,919,143 B2
(45) Date of Patent: Jul. 19, 2005

(54) POSITIVE ACTIVE MATERIAL COMPOSITION FOR LITHIUM-SULFUR BATTERY AND LITHIUM-SULFUR BATTERY FABRICATED USING SAME

(75) Inventors: Duck Chul Hwang, Cheonan (KR); Yun Suk Choi, Cheonan (KR); Soo Seok Choi, Cheonan (KR); Jea Woan Lee, Cheonan (KR); Yong Ju Jung, Taejeon (KR); Joo Soak Kim, Cheonan (KR); Zin Park, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 332 days.

(21) Appl. No.: 09/931,079

(22) Filed: Aug. 17, 2001

(65) Prior Publication Data

US 2002/0039680 A1 Apr. 4, 2002

(30) Foreign Application Priority Data

Aug. 17, 2000 (KR) .......................................... 2000-47347
Dec. 14, 2000 (KR) .......................................... 2000-76694

(51) Int. Cl.$^7$ .............................................. H01M 8/00
(52) U.S. Cl. ................ 429/231.95; 429/231; 429/218.1
(58) Field of Search ........................... 429/231.95, 231, 429/218.1, 212, 277, 221, 231.5; 525/540, 182.1

(56) References Cited

U.S. PATENT DOCUMENTS

| 5,298,055 | A | * | 3/1994 | Semel et al. .................. 75/252 |
| 5,814,420 | A | | 9/1998 | Chu |
| 6,030,720 | A | | 2/2000 | Chu et al. |
| 6,344,293 | B1 | * | 2/2002 | Geronov .................. 429/218.1 |
| 6,488,721 | B1 | * | 12/2002 | Carlson ...................... 29/623.5 |
| 6,573,004 | B1 | * | 6/2003 | Igarashi et al. ............. 429/217 |
| 6,576,370 | B1 | * | 6/2003 | Nakagiri et al. ........ 429/231.95 |
| 6,733,927 | B1 | * | 5/2004 | Takezawa et al. .......... 429/307 |

FOREIGN PATENT DOCUMENTS

CN 1271968 A 11/2000

* cited by examiner

Primary Examiner—Michael Barr
Assistant Examiner—Monique Willis
(74) Attorney, Agent, or Firm—Stein, McEwen & Bui, LLP

(57) ABSTRACT

A positive active material composition for a lithium-sulfur battery includes a positive active material, a conductive agent, an organic mixing solvent to which solubility of sulfur is equals to or less than 50 mM, and a binder capable of dissolving in the organic mixing solvent.

27 Claims, 1 Drawing Sheet

POSITIVE ACTIVE MATERIAL COMPOSITION FOR LITHIUM-SULFUR BATTERY AND LITHIUM-SULFUR BATTERY FABRICATED USING SAME

CROSS REFERENCE TO RELATED APPLICATIONS

This application is based on Korean Patent Application Nos. 00-47347 filed on Aug. 17, 2000 and 00-76694 filed on Dec. 14, 2000 in the Korean Industrial Property Office, the contents of which are incorporated hereinto by reference.

BACKGROUND OF THE INVENTION

1. Field of the Invention

The present invention relates to a positive active material composition for a lithium-sulfur battery and a lithium-sulfur battery fabricated using the same and, more specifically, to a positive active material composition for a lithium-sulfur battery with good adhesion to a current collector and which can provide a lithium-sulfur battery exhibiting good cycle life characteristics.

2. Description of the Related Art

As technologies in the field of electronics have been tremendously improved, the use of various portable electronic devices including notebook computers and mobile communication devices has become widespread in recent years. Especially, as portable electronics gets smaller, lighter and thinner, there is a growing need for batteries with a high energy density. There is also a growing need for inexpensive, safe and environmentally friendly batteries.

Lithium-sulfur batteries are attractive candidates for satisfying these requirements because sulfur is cheaper, environmentally friendly and exhibits good energy density, where lithium has a theoretical electrical capacity per weight of 3830 mAh/g and sulfur has a theoretical electrical capacity per unit weight of 1675 mAh/g.

A lithium-sulfur secondary battery uses sulfur-based compounds with a sulfur-sulfur bond as positive active material, and a lithium metal or carbon based compounds as a negative active material. The carbon-based compounds in which intercalation chemistry occurs, include graphite, graphite intercalation compounds, carbonaceous materials, and carbonaceous materials inserted with lithium. Upon discharge (electrochemical reduction), a sulfur-sulfur bond break down occurs to result in a decrease in the oxidation number of S, and upon recharging (electrochemical oxidation), a sulfur-sulfur bond formation occurs to lead to an increase in the oxidation number of S.

A lithium-sulfur battery has a shortcoming in that discharge products (lithium polysulfide, etc.) of positive active materials are dissolved in electrolyte solvents and diffused away from a positive electrode. This renders poor cell performances such as low capacity and low cycle life characteristics.

One approach to solve the dissolving problem is a solid-state or gel-state positive electrode proposed by Chu et al. (U.S. Pat. No. 5,523,179 and related continuation in-part applications), or a liquid electrode called a "catholyte" (U.S. Pat. No. 6,030,720).

Another approach is that sulfur active materials are obtained from covering a electroactive sulfur-containing material with an electroactive transition metal chalcogenide (U.S. Pat. No. 5,919,587, Skotheim et al). In this method, an electroactive sulfur-containing material is added to a solution of electroactive transition metal chalcogenide followed by the addition of a conductive agent to prepare a positive active material composition. The positive active material composition is then coated on a current collector. The transition metal chalcogenide effectively encapsulates or embeds the electroactive sulfur-containing material and chemically and electrostatically embeds the electroactive sulfur-containing material, thereby preventing the electroactive sulfur-containing material from leaving the current collector. However, the transition metal chalcogenide does not effectively retard the electroactive sulfur-containing material from leaving the current collector. U.S. Pat. No. 5,961,672 (Moltech) teaches a stabilizing film deposited-lithium anode to improve cycle life characteristics and safety. This patent does not disclose the effect of the binder TEFLONTM (PTFE-K30, Dupont) on the battery performances.

However, there has been little investigation on a binder, used in the composition of the positive electrode, which is very critical to the utilization of sulfur and the cycle life of a lithium sulfur battery.

SUMMARY OF THE INVENTION

It is an object of the present invention to provide a positive active material composition for a lithium-sulfur battery, including a binder polymer or binder polymers of which solvent does not make soluble or slightly soluble a positive active material, sulfur.

It is another object to provide a positive active material composition for a lithium-sulfur battery, including a binder polymer or binder polymers which become ionic conductive when wetted by a liquid or gel electrolyte between a positive electrode and a negative electrode.

It is still another object to provide a lithium-sulfur battery fabricated using the positive active material composition.

Additional objects and advantages of the invention will be set forth in part in the description which follows and, in part, will be obvious from the description, or may be learned by practice of the invention.

The above and other objects may be achieved by providing a positive active material composition for a lithium-sulfur battery including a positive active material, a binder, a conductive agent and an organic mixing solvent. The organic mixing solvent should have low solubility of sulfur, and preferably has solubility of sulfur which equals to or is less than 50 mM. The binder includes at least one of polymers that can be dissolved in the organic mixing solvent.

The polymer may be at least one selected from polyvinylidene fluoride, polyvinyl acetate and polyvinyl pyrrolidone, the organic mixing solvent may be dimethyl formamide, isopropyl alcohol and acetonitrile. Preferably, if polyvinylidene fluoride is used as the polymer, dimethyl formamide is used as the organic mixing solvent; if polyvinylpyrrolidone is used as the polymer, isopropyl alcohol is used as the organic mixing solvent; and if polyvinylacetate is used as the polymer, acetonitrile is used as the organic mixing solvent.

The binder may further include at least one oxide polymer selected from polyethylene oxide and polypropylene oxide, or an organic mixing solvent capable of dissolving the oxide polymer may be 1,3-dioxolane acetonitrile.

In order to achieve these and other objects, the present invention provides a lithium-sulfur battery including a positive electrode, a negative electrode, and an electrolyte. The positive electrode is produced by using the composition, and includes a positive active material including a sulfur-based compound, a binder and a conductive agent. The negative electrode includes a negative active material selected from a material in which lithium intercalation reversibly occurs, a material with which lithium reversibly reacts to form compounds, a lithium metal or a lithium alloy. The electrolyte includes a lithium salt and an electrolyte solvent.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
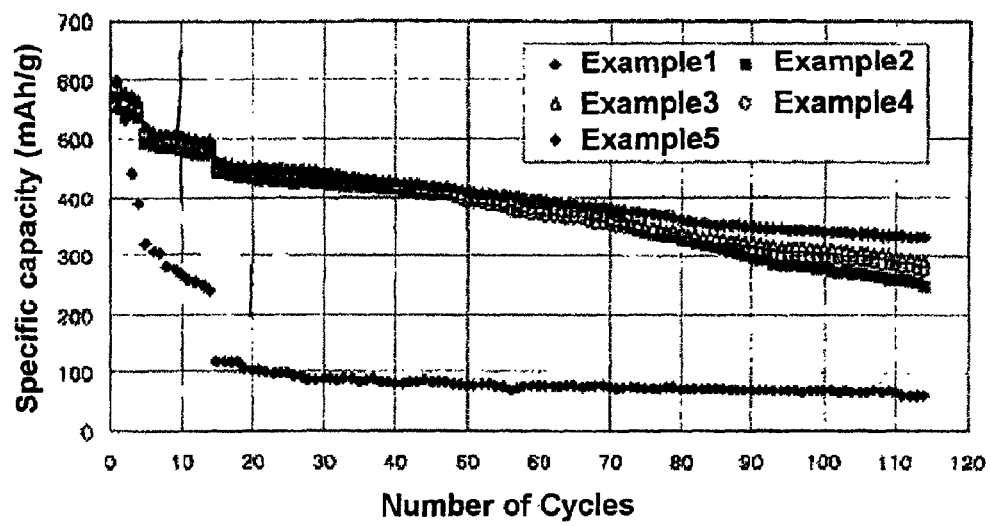
FIG. 1 is a graph showing cycle life of lithium-sulfur cells according to Examples 1 to 5 of the present invention.

The present invention relates to a binder polymer or binder polymers and its organic mixing solvent.

A positive electrode is produced by mixing a positive active material, a binder and a conductive agent in an organic mixing solvent to prepare a positive active material composition, coating the composition on a current collector, and drying the organic mixing solvent.

The binder acts to strongly adhere the positive active material and the conductive agent to the current collector and to enhance the mechanical integrity of the positive electrode. The requirements for the binder used in the lithium-sulfur battery are good solubility to the organic mixing solvent, and a good ability to form conductive networks between the positive active material and the conductive agent. In addition, it is required that the binder could be wetted in electrolyte solvents so that it has preferably highly ionic conductivity because the positive active material is reacted electrochemically as an ionic species.

The requirements for the organic mixing solvent are a good ability to dissolve the binder, a low boiling point and, more importantly, a low sulfur solubility. If an organic mixing solvent having a high sulfur solubility is used, the dissolved sulfur with a high specific gravity (D=2.07) may sink to the bottom of the coated slurry and finally to the current collector forming the insulating layer between the composition and current collector during the drying process, which causes poor ionic conductivity. An example of polyvinylidene fluoride may be taken. Conventionally, polyvinylidene fluoride is used in lithium-ion batteries. But one should be careful when it is used in lithium-sulfur batteries. This is because a sulfur active material is good soluble in N-methyl pyrrolidone which is a good solvent to polyvinylidene fluoride. If we used the polyvinylidene fluoride with the N-methyl pyrrolidone as a mixing solvent, the cell does not work well because dissolved sulfur forms the insulating layer between the conductive agents and between the composition and the current collector. Thus, the choice of the binder and its organic mixing solvent is critical to a lithium-sulfur battery exhibiting good battery performance.

In the present invention, an organic mixing solvent in which the solubility of sulfur equals or is less than 50 mM, is used. Preferably, the solubility of sulfur to the organic mixing solvent is 1 to 50 mM. Useful organic mixing solvent includes dimethylformamide, acetonitrile, or isopropylalcohol.

Preferably, the polyvinylidene fluoride binder is used together with dimethylformaimide, polyvinyl acetate with acetonitrile, and polyvinyl pyrrolidone with isopropylalcohol.

The positive active material composition of the present invention preferably includes 5 to 30 percent by weight of binder. If the amount of the binder is less than 5 percent by weight, the effective result is not obtained. If the amount of the binder is more than 30 percent by weight, the amount of positive active material is relatively reduced, decreasing capacity. When at least two binders selected from polyvinylidene fluoride, polyvinyl acetate or polyvinyl pyrrolidone are used, the mixing ratio between the binders may be suitably controlled according the desired properties.

For increasing ionic conductivity of the binder and improving cycle life characteristics, an oxide polymer selected from polyethylene oxide and polypropylene oxide may be further used, or as a suitable solvent to the oxide polymer, acetonitrile or 1,3-dioxolane may be further used. At this time, the mixing ratio between the basic binder and oxide polymer binder is 1 to 9:9 to 1 in the weight ratio. Although an oxide polymer binder is further used, the amount of binder in the positive active material composition is not out of the range 5 to 30 percent by weight.

The positive active material may include at least one selected from elemental sulfur ($S_8$), solid $Li_2S_n$ ($n \geq 1$), an organic-sulfur compound and a carbon-sulfur polymer [$(C_2S_x)_n$, x=2.5 to 50, n≥2].

The positive electrode includes electrically conductive materials that facilitate the movement of electrons within the positive electrode with a sulfur-based compound or optionally include additives. Examples of the conductive material are not limited to these but include a conductive carbon material such as graphite, carbon black, a conductive polymer such as polyaniline, polythiopene, polyacetylene, or polypyrrol, or a combination thereof.

A method of preparing a positive electrode using the active material composition of the present invention will be illustrated in more detail. A binder is dissolved in a solvent and a conductive material is dispersed therein to obtain a dispersion solution. Then, a sulfur-based compound is homogeneously dispersed in the dispersion solution to prepare a positive electrode composition (e.g., a slurry). The composition is coated to a current collector and the coated collector is dried to form a positive electrode. The current collector is not limited, but is preferably made of a conductive material such as stainless steel, aluminum, copper or titanium. It is more preferable to use a carbon-coated aluminum current collector. The carbon-coated aluminum current collector has excellent adhesive properties to the coated layer including positive materials shows a lower contact resistance, and inhibits a corrosion by polysulfide compared with bare aluminum current collector.

The negative electrode includes a negative active material selected from materials in which lithium intercalation reversibly occur, materials which react with lithium to form a compound, lithium alloy, or lithium metal. The lithium alloy includes a lithium/aluminum alloy, or a lithium/tin alloy. In addition, during charging and discharging of the lithium-sulfur battery, the positive active material (active sulfur) converts to an inactive material (inactive sulfur), which can be attached to the surface of the negative electrode. The inactive sulfur, as used herein, refers to sulfur that has no activity upon repeated electrochemical and chemical reactions so it cannot participate in an electrochemical reaction of the positive electrode. The inactive sulfur on the surface of the negative electrode acts as a protective layer of the lithium negative electrode.

The materials in which lithium intercalation reversibly occurs are carbon-based compounds. Any carbon material may be used as long as it is capable of intercalating and deintercalating lithium ions. Examples of the carbon material include crystalline carbon, amorphous carbon, or a mixture thereof. An example of the material which reversibly reacts with lithium to form a lithium compound, is titanium nitrate, but not limited to this.

The electrolyte of the present invention includes a lithium salt as supporting electrolyte salt and a non-aqueous organic solvent (electrolyte solvent). The electrolyte solvent includes solvents in which elemental sulfur ($S_8$), lithium sulfide ($Li_2S$), lithium polysulfide ($Li_2S_n$, n=2, 4, 6, 8 . . . ) are good soluble. The organic solvent includes benzene, fluorobenzene, toluene, trifluorotoluene, xylene, cyclohexane, tetrahydrofuran, 2-methyl tetrahydrofuran, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxy ethane, 1,3-dioxolane, diglyme, tetraglyme, ethylene carbonate, propylene carbonate, γ-butyrolactone, sulforane, or a mixture thereof.

The lithium salt includes lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), lithium bis (trifluoromethyl) sulfoneimide ($LiN(SO_2CF_3)_2$), or a mixture thereof. The electrolyte includes a concentration of 0.5 to 2.0M of the lithium salt.

Hereinafter, the present invention will be explained in detail with reference to examples. These examples, however, should not in any sense be interpreted as limiting the scope of the present invention.

EXAMPLE 1

A polyvinylidene fluoride binder was dissolved in an N,N-dimethylformamide (solubility of sulfur: 20 mM) organic mixing solvent to prepare a binder solution. To the binder solution, a carbon powder conductive agent was added, and distributed. The resulting mixture was mixed with an elemental sulfur ($S_8$) powder with an average diameter of about 20 μm and they were shaken using a ball mill for one day or more to obtain a positive active material slurry. At this time, the positive active material ($S_8$):the binder:the conductive agent was 60:20:20 wt %.

The positive active material slurry was coated on a Al-coated current collector and dried in a drying oven of 80° C. for 1 hour. The dried collector was roll-pressed by a thickness of about 50 μm to produce a positive electrode.

For a negative electrode, a fresh lithium metal foil (thickness 50 μm) was used.

The produced positive electrode was allowed to stand in a vacuum oven (60° C.) for 1 hour or more and transferred into a glove box which is capable of controlling water and oxygen. In the glove box, using the positive electrode and the negative electrode, a coin-cell was fabricated. For an electrolyte, 1M $LiSO_3CF_3$ in a mixture of 1,3-dioxolane, diglyme, sulforane and dimethoxyethane (50:20:10:20 volume ratio) was used.

COMPARATIVE EXAMPLE 1

A coin-cell was fabricated by the same procedure in Example 1 except that N-methyl pyrrolidone (solubility of sulfur 450 mM or more) was used instead of N,N-dimethyl foramide.

The coin-cells according to Example 1 and Comparative example 1 were aged at room temperature for 24 hours. A discharge cut-off voltage was set to 1.8 V and a charge capacity was set to 110% of a theoretical capacity. While the charge and discharge rates (current density) were varied in order of 0.1C (1 cycle), 0.2C (3 cycles), 0.5C (5 cycles) and 1C (100 cycles), the positive active materials were charged and discharged between 1.5V to 2.8V. The cycle life characteristics and initial discharge capacity at 1C are shown in Table 1.

TABLE 1

| | Organic mixing solvent/binder | Cycle life characteristics (capacity after 100th charge and discharge cycles at 1C) (%) | Initial discharge capacity (mAh/g) |
|---|---|---|---|
| Example 1 | DMF/PVdF | 11 | 550 |
| Comparative Example 1 | NMP/PVdF | — | 10 |

DMF: N,N-methylformamide
PVdF: Polyvinylidene fluoride

As shown in Table 1, the initial discharge capacity of the cell according to Example 1 is surprisingly higher than that of Comparative example 1. In addition, the capacity of a cell according to Comparative example 1 is not measured and this indicates that the charge and discharge does not proceed and this cell cannot be used after the 100th charge and discharge cycles. On the other hand, the charge and discharge reaction proceeds in the cell according to Example 1 after the 100th charge and discharge. Thus, the cycle life characteristic of cell of Example 1 is greatly improved from that of Comparative example 1.

EXAMPLE 2

A coin-cell was fabricated by the same procedure in Example 1 except that a polyvinyl pyrrolidone binder was used and an isopropyl alcohol solvent was used instead of polyvinylidene fluoride and N,N-dimethylformamide, respectively.

EXAMPLE 3

A coin-cell was fabricated by the same procedure in Example 1 except that a polyvinyl acetate binder was used and an acetonitrile solvent was used instead of polyvinylidene fluoride and N,N-dimethylforamide, respectively.

EXAMPLE 4

Polyvinylidene fluoride and polyvinyl acetate were dissolved in N,N-dimethylformamide to prepare a binder solution. At this time, polyvinylidene fluoride:polyvinyl acetate was 1:1 in weight ratio. 20 percent by weight of the binder solution was well mixed with 60 percent by weight of elemental sulfur and 20 percent by weight of a carbon conductive agent to obtain a positive active material slurry. The positive active material slurry was coated on a carbon-coated Al current collector.

The coated collector was dried under a vacuum for 12 hours or more to produce a positive electrode. The positive electrode and the vacuum dried separator were transferred into a glove box. The electrolyte of 1M $LiSO_3CF_3$ in 1,3-dioxolane/diglyme/dimethoxy ethane (50/20/10/20 volume ratio) was placed on the positive electrode followed by placement of the separator. A trace of electrolyte was then added on the separator. A lithium metal electrode as a negative electrode was placed on the separator and then the lithium-sulfur cell was fabricated in a conventional manner.

EXAMPLE 5

A lithium-sulfur cell was fabricated by the same procedure in Example 1 except that polyvinylidene fluoride, polyvinyl acetate and polyvinyl pyrrolidone (1:1:1 weight ratio) were used instead of polyvinylidene fluoride and N,N-dimethylformamide.

In order to identify the relationship between the binder type, and cycle life characteristics and initial discharge capacity, the cycle life characteristics and initial discharge capacity of the lithium-sulfur cells according to Examples 1 to 5 were measured. The lithium-sulfur-cells according to Examples 1 to 5 were aged at room temperature for 24 hours. While the charge and discharge rates (current density) were varied in order of 0.1C (1 cycle), 0.2C (3 cycles), 0.5C (5 cycles) and 1C (100 cycles), the positive active materials were charged and discharged between 1.5V to 2.8V. The results are presented in Table 2.

TABLE 2

| Binder/solvent | Cycle life characteristics (capacity after 100th/ capacity at initial) (%) | Initial discharge capacity (mAh/g) |
| --- | --- | --- |
| Example 1 PVdF/DMF | 11 | 550 |
| Example 3 PVP/IPA | 52 | 600 |
| Example 2 PVAc/ACN | 44 | 571 |
| Example 4 PVdF/PVAc (1:1)/DMF | 50 | 585 |
| Example 5 PVdF/PVAc/PVP (1:1:1)/DMF | 58 | 594 |

*PVdF: polyvinylidene fluoride
*PVAc: polyvinyl acetate
*PVP: polyvinyl pyrrolidone
*DMF: N,N-dimethyl formamide
*ACN: acetonitrile
*IPA: isopropyl alcohol It is evident from Table 2 that the lithium-sulfur cells according to Examples 4 and 5 exhibited dramatically good cycle life characteristics, and a better initial discharge capacity than Example 1, and better cycle life characteristics and initial discharge capacity than Example 3. Furthermore, the lithium-sulfur cells according to Examples 4 and 5 exhibited corresponding to or better cycle life characteristics and initial discharge capacity than Example 3.

Comparing Example 1 and Example 2, the discharge capacities were similar, but the cycle characteristics dramatically increased according to the binder type (11%→44%). This result reveals that an electrolyte is immersed easier into polyvinyl acetate than polyvinylidene fluoride so that a redox reaction of sulfur actively occurs and the cycle life characteristics are improved.

The cell of Example 3 exhibited improved initial discharge capacity by about 5% or more (571→600) and the improved cycle life characteristics from 44% to 52% than Example 2. This result reveals that an electrolyte is immersed easier into polyvinyl pyrrolidone than polyvinylidene acetate.

The capacities according to the charge and discharge cycles (cycle life characteristics) of the lithium-sulfur cells of Examples 1 to 5 are presented in FIG. 1. The sulfur-cell of Example 5 exhibited the best cycle life characteristics, and the sulfur-cells of Examples 2 to 5 exhibited better cycle life characteristics than Example 1. These results reveal that the sulfur-cell of Example 1 uses polyvinylidene fluoride into which an electrolyte is immersed with more difficultly than other binders.

EXAMPLE 6

A lithium-sulfur cell was fabricated by the same procedure in Example 1 except that polyvinylidene fluoride and polyethylene oxide were dissolved in N,N-dimethylformamide and 1,3-dioxolane.

EXAMPLE 7

A lithium-sulfur cell was fabricated by the same procedure in Example 6 except that polyviny acetate and polyethylene oxide were dissolved in acetonitrile and 1,3-dioxolane instead of polyvninylodene fluoride.

EXAMPLE 8

A lithium-sulfur cell was fabricated by the same procedure in Example 1 except that polyvinyl pyrrolidone and polyethylene oxide were dissolved in isopropyl alcohol and 1,3-dioxolane instead of N,N-methylformamide.

The effects of an oxide polymer binder on the electrochemical performance were determined. The lithium-sulfur-cells according to Examples 1 to 3, and Example 6 to 8 were aged at room temperature for 24 hours. While the charge and discharge rates (current density) were varied in order of 0.1C (1 cycle), 0.2C (3 cycles), 0.5C (5 cycles) and 1C (100 cycles), the positive active materials were charged and discharged between 1.5V to 2.8V. The cycle life characteristics and initial discharge capacity are presented in Table 3.

TABLE 3

| Binder/solvent | Cycle life characteristics (capacity after 100th/ capacity at initial) (%) | Initial discharge capacity (mAh/g) |
| --- | --- | --- |
| Example 2 PVAc/ACN | 44 | 571 |
| Example 6 PVdF/PEO/DMF/DOX | 20 | 576 |
| Example 1 PVdF/DMF | 11 | 550 |
| Example 8 PVP/PEO/IPA/DOX | 60 | 650 |
| Example 3 PVP/IPA | 52 | 600 |
| Example 7 PVAc/PEO/ACN/DOX | 54 | 590 |

*PVdF: polyvinylidene fluoride
*PVAc: polyvinyl acetate
*PVP: polyvinyl pyrrolidone
*PEO: polyethylene oxide
*DMF: N,N-dimethyl formamide
*ACN: acetonitrile
*IPA: isopropyl alcohol
*DOX: 1,3-dioxolane As shown in Table 3, the cells according to Examples 6 to 8 exhibited a slightly higher initial discharge capacity (19–50 mAh/g) and improved cycle life characteristics by 8 to 10% than that according to Examples 1 to 3 (comparing Examples 1 to 6, 2 to 7 and 3 to 8). This result is obtained from polyethylene oxide which acts as a binder and helps to activate the movement of lithium ions through the positive electrode.

Figure 2:
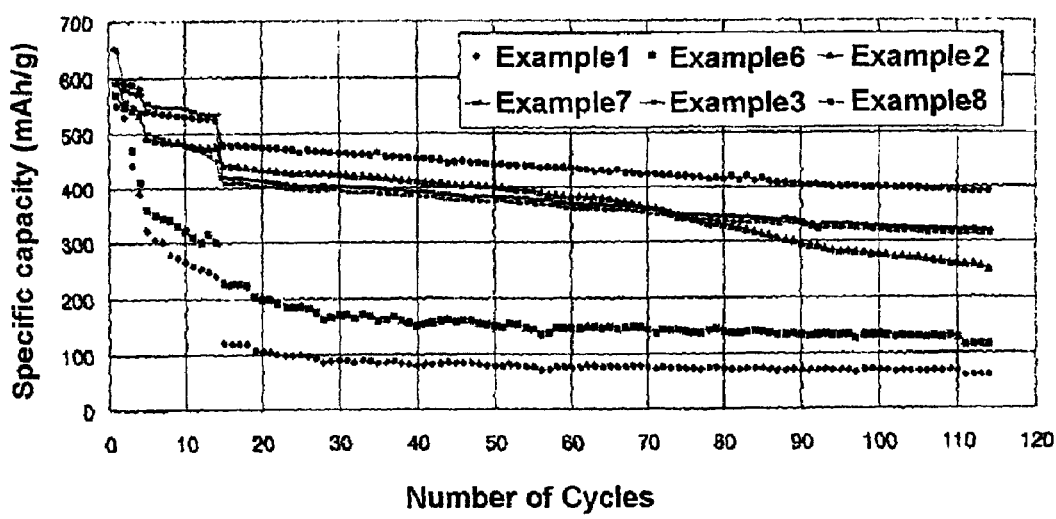
FIG. 2 is a graph illustrating cycle life of lithium-sulfur cells according to Examples 1 to 3 and 6 to 8.

In addition, the capacities according to charge and discharge cycles (cycle life characteristics) of the lithium-sulfur cells of Examples 1 to 3 and Examples 6 to 8 are presented in FIG. 2. The lithium-sulfur cells according to Examples 2–3 and Examples 7–8 exhibited similar results except for Example 6. This is considered due to polyvinylidene fluoride being used in Example 6.

Based on the foregoing, it can be seen that the lithium-sulfur battery of the present invention exhibits better initial discharge capacity and cycle life characteristics than that of the conventional lithium-sulfur battery.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material composition for a positive electrode of a lithium-sulfur battery comprising:
   a positive active material comprising a sulfur-based compound;
   a conductive agent;
   an organic mixing solvent comprising isopropyl alcohol, wherein the organic mixing solvent is non-aqueous and has a solubility of sulfur equal to or less than 50 mM; and
   a binder comprising polyvinyl pyrrolidone, which is dissolvable in the organic mixing solvent that comprises isopropyl alcohol, wherein an amount of the binder is at least five percent by weight with respect to the positive active material composition.

2. The positive active material composition of claim 1, wherein the binder further comprises at least an oxide polymer selected from the group consisting of polyethylene oxide and polypropylene oxide.

3. The positive active material composition of claim 1, wherein:
   the binder further comprises at least one first polymer selected from the group consisting of polyvinylidene fluoride and polyvinyl acetate;
   the organic mixing solvent is a first organic mixing solvent which dissolves the first polymer and further comprises an organic solvent selected from the group consisting of dimethylformamide and acetonitrile;
   the positive active material composition further comprises:
      at least one oxide polymer selected from the group consisting of polyethylene oxide and polypropylene oxide; and
      a second organic mixing solvent which dissolves the oxide polymer and is selected from the group consisting of 1,3-dioxolane and acetonitrile.

4. The positive active material composition of claim 1, wherein the binder further comprises polyvinylidene fluoride, and the organic mixing solvent further comprises dimethyl formamide.

5. The positive active material composition of claim 1, wherein the binder further comprises polyvinylacetate and the organic mixing solvent further comprises acetonitrile.

6. The positive active material composition of claim 1, wherein the sulfur-based compound is at least one compound selected from the group consisting of elemental ($S_8$), solid $Li_2S_n$ ($n \geq 1$), an organic-sulfur compound and a carbon sulfur polymer $(C_2S_x)_n$, where x=2.5 to 50, and n is an integer $\geq 2$.

7. The positive active material composition of claim 1, wherein the positive active material composition comprises 5 to 30 percent by weight of the binder.

8. The positive active material composition of claim 1, wherein the organic mixing solvent has a solubility of sulfur of 1 to 50 mM.

9. The positive active material composition of claim 3, wherein a mixing ratio between the binder and the at least one oxide polymer is 1 to 9:9 to 1 in weight ratio.

10. The positive active material composition of claim 1, wherein the conductive agent is a at least one conductive carbon material selected from the group consisting of graphite, carbon black, polyaniline, polythiopene, and polypyrrol.

11. A lithium-sulfur battery comprising:
   a positive active material including a sulfur-based compound, a binder and a conductive agent, the binder comprising polyvinyl pyrrolidone dissolved in an organic mixing solvent, wherein the organic mixing solvent comprises is propyl alcohol, wherein the organic mixing solvent is non-aqueous and has a solubility of sulfur equal to or less than 50 mM, and wherein an amount of the binder is at least five percent by weight with respect to the positive active material composition;
   a negative electrode comprising a negative active material, the negative active material being selected from the group consisting of materials in which lithium intercalation reversibly occurs, materials which react with lithium to form a lithium compound, a lithium metal and a lithium alloy; and
   an electrolyte comprising a lithium salt and an electrolyte-organic solvent.

12. The lithium-sulfur battery of claim 11, wherein the binder further comprises at least oxide polymer selected from the group consisting of polyethylene oxide and polypropylene oxide.

13. The lithium-sulfur battery of claim 11, wherein the sulfur compound is at least one compound selected from the group consisting of elemental ($S_8$), solid $Li_2S_n$ ($n \geq 1$), an organosulfur compound and a carbon sulfur polymer $(C_2S_x)_n$, where x=2.5 to 50, and n is an integer $\geq 2$.

14. The lithium-sulfur of claim 11, wherein the electrolyte-organic solvent further comprises an organic solvent selected from the group consisting of benzene, fluorobenzene, toluene, trifluorotoluene, xylene, cyclohexane, tetrahydrofuran, 2-methyl tetrahydrofuran, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxy ethane, 1,3-dioxolane, diglyme, tetraglyme, ethylene carbonate, propylene carbonate, γ-butyrolactone and sulfolane.

15. The lithium-sulfur battery of claim 11, wherein the lithium salt is at least one compound selected from the group consisting of lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$) and lithium bis(trifluoromethyl) sulfoneimide($LiN(SO_2CF_3)_2$).

16. The lithium-sulfur battery of claim 11, wherein the electrolyte comprises a concentration of 0.5 to 2.0 M of the lithium salt.

17. The lithium-sulfur battery of claim 8, wherein the organic mixing solvent has a solubility of sulfur of 1 to 50 mM.

18. A positive active material composition for a positive electrode of a lithium-sulfur battery comprising:
   a positive active material comprising a sulfur-based compound;
   a conductive agent;
   an organic mixing solvent comprising isopropyl alcohol, wherein the organic mixing solvent is non-aqueous and has a solubility of sulfur equal to or less than 50 mM; and a binder comprising polyvinyl pyrrolidone, wherein an amount of the binder is at least five percent by weight with respect to the positive active material composition.

19. The positive active material composition of claim 18, wherein the binder further comprises at least oxide polymer selected from the group consisting of polyethylene oxide and polypropylene oxide, and the organic solvent further comprises 1,3-dioxolane.

20. The positive active material composition of claim 18, wherein the positive active material composition comprises 5 to 30 percent by weight of the binder.

21. A positive active material composition for a positive electrode of a lithium-sulfur battery comprising:

a positive active material comprising a sulfur-based compound;

a conductive agent;

an organic mixing solvent comprising isopropyl alcohol, wherein the organic mixing solvent is non-aqueous and has a solubility of sulfur equal to or less than 50 mM; and a binder comprising polyvinyl pyrrolidone, wherein an amount of the binder is at least five percent by weight with respect to the positive active material composition.

22. A method of preparing a positive electrode for a lithium-sulfur battery comprising:

dissolving a binder comprising polyvinyl pyrrolidone in an organic mixing solvent comprising isopropyl alcohol wherein the organic mixing solvent is non-aqueous and has a solubility of sulfur equal to or less than 50 mM, to obtain a first mixture, and an amount of the binder is at least five percent by weight with respect to a positive active material comprising a sulfur-based compound;

dispersing a conductive agent into the first mixture to obtain a dispersion solution;

homogeneously dispersing the positive active material in the dispersion solution, to prepare a positive electrode composition; and coating the positive electrode composition to a current collector and drying the coated current collector.

23. The method of claim 22, wherein the organic mixing solvent further includes an organic solvent selected from the group consisting of dimethylformamide and acetonitrile.

24. The method of claim 22, wherein the binder further comprises at least oxide polymer selected from the group consisting of polyethylene oxide and polypropylene oxide.

25. A method of preparing a positive electrode for a lithium-sulfur battery comprising:

dissolving a binder comprising polyvinyl pyrrolidone in an organic mixing solvent comprising isopropyl alcohol wherein the organic mixing solvent non-aqueous and has a solubility of sulfur equal to or less than 50 mM to obtain a first mixture and wherein an amount of the binder is at least five percent by weight with respect to the positive active material composition;

dispersing a conductive agent into the first mixture to obtain a dispersion solution;

homogeneously dispersing a positive active material comprising a sulfur-based compound in the dispersion solution, to prepare a positive electrode composition; and coating the positive electrode composition to a current collector and drying the coated current collector.

26. The method of claim 25, wherein the organic mixing solvent further comprises an organic solvent selected from the group consisting of dimethylformamide and acetonitrile.

27. The method of claim 25, wherein the binder further comprises at least an oxide polymer selected from the group consisting of polyethylene oxide and polypropylene oxide.

* * * * *

UNITED STATES PATENT AND TRADEMARK OFFICE
CERTIFICATE OF CORRECTION

| | |
|---|---|
| PATENT NO. | : 6,919,143 B2 |
| DATED | : July 19, 2005 |
| INVENTOR(S) | : Duck Chul Hwang et al. |

Page 1 of 1

It is certified that error appears in the above-identified patent and that said Letters Patent is hereby corrected as shown below:

<u>Column 12,</u>
Line 16, insert -- is -- after "solvent".

Signed and Sealed this

Twenty-seventh Day of September, 2005

JON W. DUDAS
*Director of the United States Patent and Trademark Office*